United States Patent [19]

Urai

[11] Patent Number: 4,831,697
[45] Date of Patent: May 23, 1989

[54] METHOD OF MAKING INTEGRALLY FOAM-MOLDED SEATS

[75] Inventor: Muneharu Urai, Akishima, Japan
[73] Assignee: Tachi-S Co., Ltd., Akishima, Japan
[21] Appl. No.: 159,278
[22] Filed: Feb. 23, 1988
[51] Int. Cl.$^4$ .............................................. B68G 7/00
[52] U.S. Cl. ..................... 29/91.1; 29/91.5; 29/91.6; 29/458
[58] Field of Search ............ 29/91, 91.1, 91.6, 91.5, 29/448, 577.1

[56] References Cited

U.S. PATENT DOCUMENTS

| | | | |
|---|---|---|---|
| 2,785,440 | 3/1957 | Toulmin, Jr. | 29/91.1 X |
| 2,955,972 | 10/1960 | Wintermute et al. | 29/91.1 |
| 4,107,829 | 8/1978 | Urai et al. | 29/91.1 |

FOREIGN PATENT DOCUMENTS 873518 7/1961 United Kingdom ............ 29/91.1

Primary Examiner—Timothy V. Eley
Attorney, Agent, or Firm—Oldham & Oldham Co.

[57] ABSTRACT

In a method of making an integrally foam-molded seat by disposing a surface cover in a molding cavity of a mold used for molding a polyurethane foam and having a seat surface pattern embossed on its inner wall of the molding cavity, injecting a polyurethane resin solution into the molding cavity of the mold and foaming the polyurethane resin to mold the polyurethane foam integrally combined with the surface cover, a sharp shape of the embossed or relief pattern is assured on the surface cover which is integrally secured to the polyurethane foam.

2 Claims, 3 Drawing Sheets

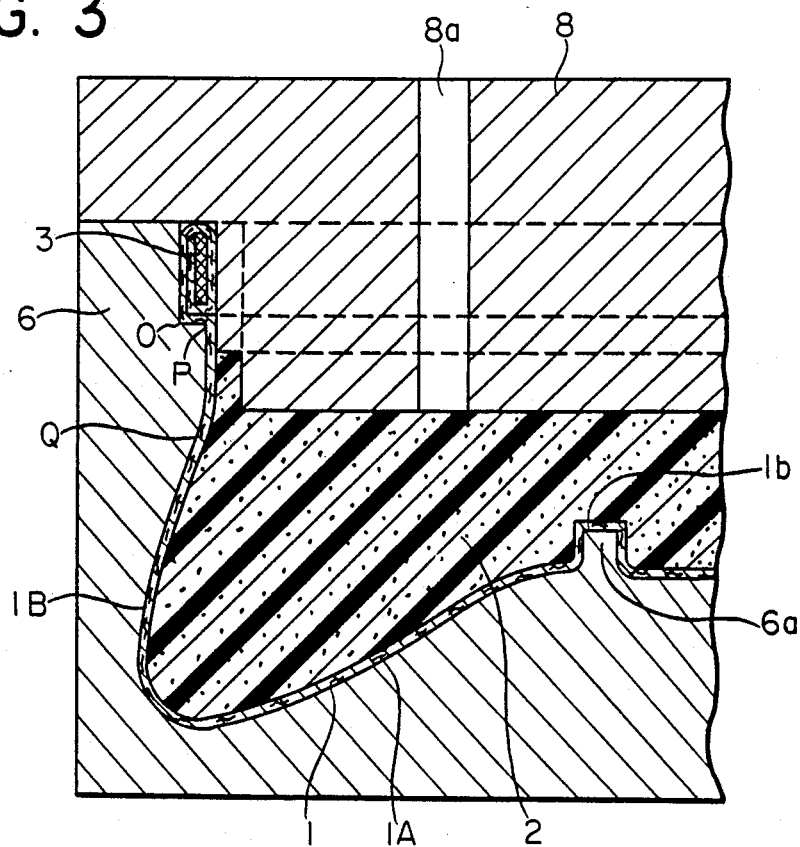
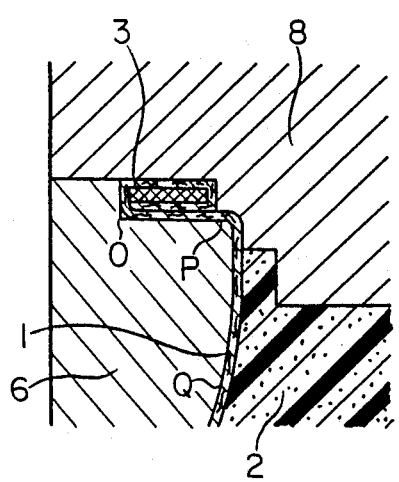
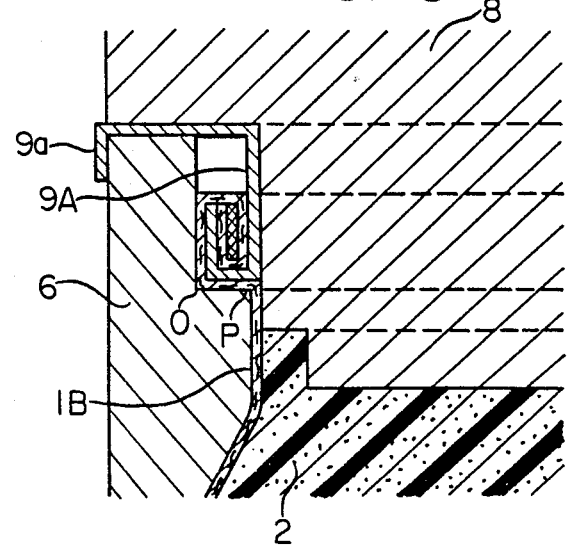

METHOD OF MAKING INTEGRALLY FOAM-MOLDED SEATS

TECHNICAL FIELD

This invention relates to seats, and more particularly to a method of making integrally foam-molded seats for use in automobiles, which facilitates and ensures accurate mounting of a surface cover during the step of foam molding, and also ensures the formation of sharply embossed patterns or sharp relief patterns on the surface cover.

BACKGROUND ART

In a prior art method of making an integrally foam-molded seat, a seat surface cover is placed inside a mold to extend along the internal contour of the molding cavity of the mold, and a polyurethane resin solution is directly injected onto the surface cover in the mold to make the desired integrally foam-molded seat. In this molding process, embossed patterns or relief patterns (such as those for grooves, button-like formations, and emblems or other designs) are formed on the surface cover. However, the prior art method has the following defects:

(A) It is difficult to accurately position marginal end edges of the surface cover at the predetermined portion of the mold. Experience and man-hours are required therefor, and rejects are apt to be produced.

(B) Because the foaming pressure only is resorted to for molding the polyurethane foam integrally combined with the surface cover, the molded shape is not accurate due to the insufficient pressure.

DISCLOSURE OF THE INVENTION

With a view to obviate the prior art defects pointed out above, it is an object of the present invention to provide a method of making integrally foam-molded seats which facilitates accurate positioning of marginal end edges of a surface cover at the predetermined portion of a mold and which can accurately form the desired pattern or relief on the surface cover.

According to the present invention, there is provided with a method of making integrally foam-molded seats, by disposing a surface cover in conformity with an embossed or relief pattern of a lower mold for polyurethane foam molding, said mold having an inner molding cavity corresponding to the shape of a seat with said embossed or relief pattern, injecting polyurethane resin solution onto said surface cover disposed in said inner molding cavity of said lower mold so as to mold the polyurethane foam integrally combined with said surface cover, said method comprising steps of:

defining, adjacent to an upper peripheral edge of the molding cavity of said lower mold, a mold portion having a shape conforming to the shape of the combination of the upper end of the surface cover and a surface-cover end retaining member;

placing the surface cover along the inner wall surface of the molding cavity of said lower mold;

injecting the polyurethane resin solution into the molding cavity of said lower mold; and foaming the polyurethane resin to mold the polyurethane foam integrally combined with said surface cover.

Thus, the surface cover can be accurately and quickly mounted in position in the lower mold and can be accurately shaped, thereby minimizing production cost of seats.

BRIEF DESCRIPTION OF THE DRAWINGS

FIG. 1b partial modification of FIG. 1a.

FIG. 2b shows a partial modification of FIG. 2a.

FIG. 2c another partial modification of FIG. 2a.

FIG. 3 is a sectional view of a lower mold and a mating upper mold employed in an embodiment of the present invention.

FIG. 4 shows a partial modification of FIG. 3.

FIG. 5 is a partial sectional view showing another modification of FIG. 3.

DESCRIPTION OF THE PREFERRED EMBODIMENTS

Figure 1A:
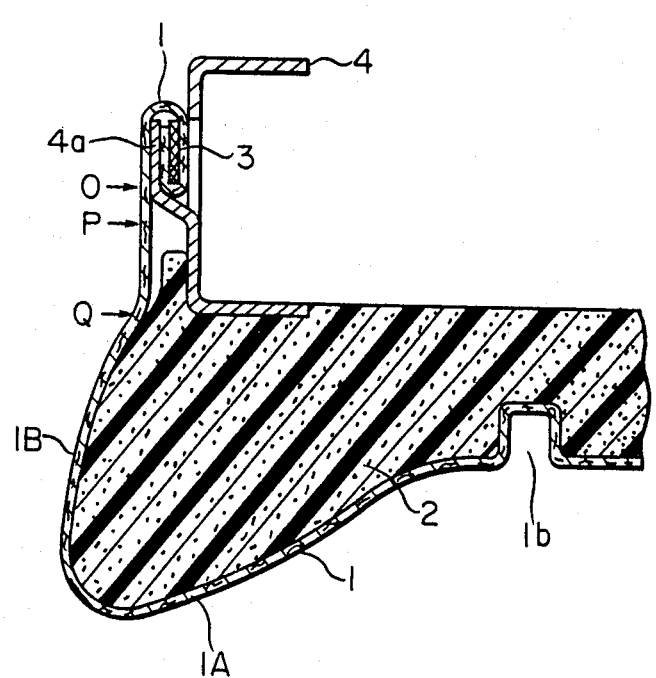
FIG. 1a is a sectional view of part of a typical front seat.

Preferred embodiments of the present invention will now be described in detail with reference to the drawings.

A sectional shape of a completed typical seats are shown in FIGS. 1a, 1b, 2a, 2b and 2c. Each seat is illustrated upside down, and an occupant sits on the lower part.

A surface cover 1 has the external shape of the seat as shown. This surface cover 1 is integrally combined with a molded polyurethane foam 2 at the time of molding the polyurethane foam 2. The marginal end edge of the surface cover 1 is retained by a surface-cover end retaining member 3. A surface cover retaining portion 4a formed as a part of a seat frame 4 is inserted between the layers of the surface cover 1 retained by the surface-cover end retaining member 3 so as to fix the end of the surface cover 1 to the frame 4.

Figure 1B:
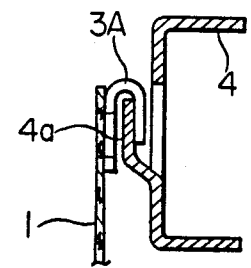

FIG. 1b shows a modification 3A of the surface-cover end retaining member 3 shown in FIG. 1a. This modification 3A has a hook-like sectional shape to serve the similar purpose.

Figure 2A:
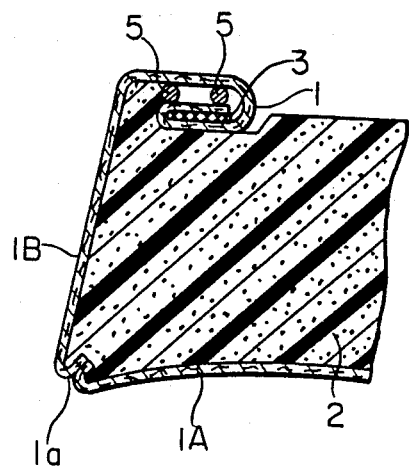
FIG. 2a view of part of a rear seat.
Figure 2B:
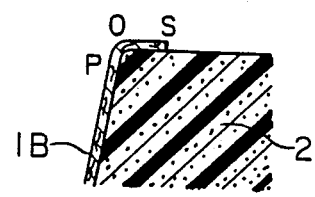
Figure 2C:
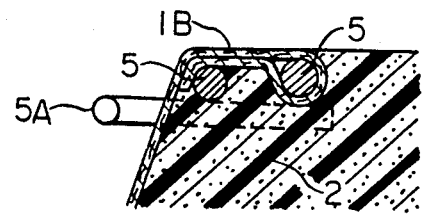

FIG. 2a shows a sectional shape of a typical rear seat. In FIG. 2a, in lieu of the surface-cover retaining portion 4a, an end of a surface cover 1 and a surface-cover end retaining member 3 are held between a molded polyurethane foam 2 and two lower border wires 5 to fix the surface cover 1. The lower border wires 5 may have a plate-like shape. The material of a seat base part 1A of the surface cover 1 may differ from that of a side part 1B of the surface cover 1, and these parts 1A and 1B are joined at a surface cover joint 1a. FIGS. 2b and 2c show modifications of rear seat.

The material of the parts 1A and 1B of the surface cover 1 is woven cloth, knit cloth, non-woven cloth, artificial leather made of polyvinyl chloride, that is trim cover, or the like and is stretchable when so required. A filler pad (not shown) may be bonded to the surface cover 1 by adhesive or fusing.

An embodiment of the method of the present invention will now be described with reference to FIG. 3.

The portion O-P-Q of the surface cover 1 mounted on the surface cover retaining portion 4a of the seat frame 4 shown in FIG. 1a is laid along a curved surface of a molding cavity of a lower mold 6 as shown by 0-P-Q in FIG. 3. This curved surface of the molding cavity has a seat surface pattern embossed thereon. After the position of the marginal end edge of the surface cover 1 is determined between the points 0 and P of the lower mold 6, an upper mold 8 is lowered to be mated with the lower mold 6. When a resilient surface-cover end retaining member 3 is used, the member 3 is mounted onto the lower mold 6 by its resiliency.

Then, a solution of the polyurethane resin is injected from a material injection port 8a of the upper mold 8 into the molding cavity of the lower mold 6 or injected directly into the molding cavity of the lower mold 6 without providing the injection port 8a in the upper mold 8, and the injected polyurethane resin solution is foamed. The known HR molding method foaming and molding the polyurethane resin at a high pressure, a high speed and a low temperature as well as the known HOT molding method foaming and molding the resin at a low pressure and a high temperature is applicable to the present invention. If a high pressure and high speed method is not used, it is recommended to use a heat melting film on the surface cover or on a wadding (not shown) and to inject thereonto polyurethane resin solution to form polyurethane foam. In the foaming process, the impregnation of the resin into the surface cover can be prevented by the presence of the film which in turn melt to act as an adhesive for the polyurethane foam, the surface cover and wadding.

The polyurethane foam 2 molded integrally with the surface cover 1 in the lower mold 6 has an overhanging configuration. However, because the completed integral assembly of the surface cover 1 and the molded polyurethane foam 2 is soft and easily deformable, it can be easily taken out from the lower mold 6. After the assembly is taken out from the lower mold 6, the portion 0-P-Q curved in the lower mold 6 is straightened as shown in FIG. 1a. In order to obtain sharp shape of a groove 1b (FIGS. 1a and 3), it is recommendable to emboss the surface cover 1 by using a convex portion 6a of the lower mold 6 and a corresponding concave portion (not shown) of an upper mold, before the foaming process.

Further, in the lower mold 6 shown in FIG. 3, the part corresponding to the portion P-Q of the surface cover 1 is suitably tapered in such a relation that the gap between the upper mold 8 and the lower mold 6 is progressively narrowed in the down direction, thereby improving the airtightness between the upper mold 8 and the lower mold 6. This applies also to other embodiments.

FIG. 4 shows that the surface cover end retaining member 3 shown in FIG. 3 is arranged in a horizontal direction together with the part 0-P of the surface cover 1 in the lower mold 6.

The surface cover end retaining member 3 can be inserted between the surface cover 1 and the lower border wires 5 shown in FIG. 2a according to a method similar to that shown in FIGS. 3 and 4.

In the figures described above, the surface-cover end retaining member 3 is generally engaged by the entire marginal end edge of the surface cover 1, but, in some case, it may not be engaged by the entire marginal end edge of the surface cover 1.

FIG. 5 shows another modification of the structure shown in FIG. 3. Referring to FIG. 5, the surface cover mounting plate 9 extending along the entire side part 1B of the surface cover 1 is eliminated, and a surface cover mounting plate 9A of short length retains the upper end of the side part 1B of the surface cover 1 and has an extension 9a which is inserted between the upper mold 8 and the lower mold 6.

Figure 6:
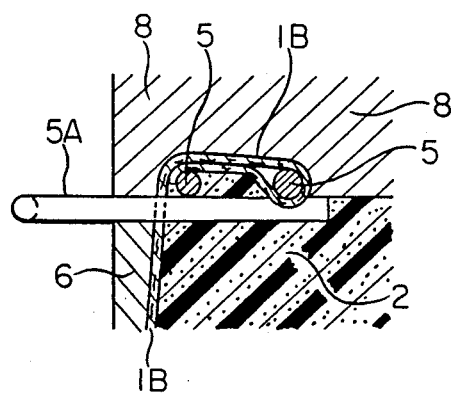
FIG. 6 is a partial sectional views showing a further modification of FIG. 3.

FIG. 6 shows a method for obtaining the modification shown in FIG. 2c wherein the surface-cover end retaining member 3 is eliminated. As shown in FIG. 6, two lower border wires 5 are welded to a lower border combining wire 5A. A portion of the combining wire 5A extending from the lower mold 6 is usually used for fixing the rear seat to the body of a vehicle.

In this embodiment, the surface cover 1B, the lower border wires 5, and the combining wire 5A are integrally combined by the foaming process of the polyurethane foam 2. Other members such as spring wires (not shown), the lower border wires 5 and the frame 4 for constituting a seat are also combined as a one-piece structure by the above-mentioned foaming process. Thus the assembling procedure is concurrently finished.

Figure 7:
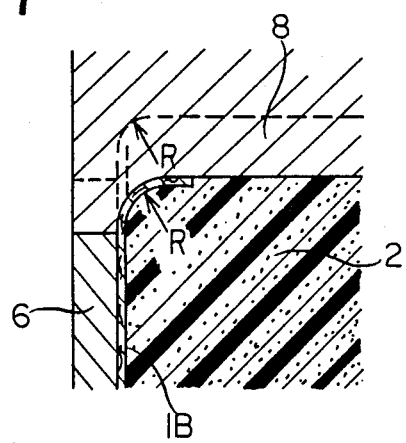
FIG. 7 is a partial sectional view showing a still further modification of FIG. 3.

FIG. 7 shows a method for obtaining the structure shown in FIG. 2b. The upper mold 8 has a rounded portion R. When the upper mold 8 descends, the surface cover 1B is rounded by the presence of the portion R to form the shape shown in FIG. 7. The surface cover 1B is then impregnated with the polyurethane foam 2 and fixed in place.

Figure 8:
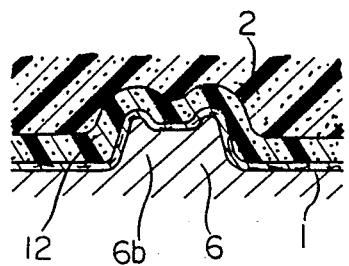
FIG. 8 is an enlarged sectional view of a button-shaped portion of a seat with the corresponding portion of a mold.

FIG. 8 shows a button-like formation. The surface cover 1 and the wadding 12 are previously embossed to the button-like shape, at the outside of the lower mold 6. Then the embossed surface cover 1 and the wadding 12 is placed in the corresponding convex portion 6b of the lower mold 6, and the foam-molding is carried out.

Figure 9:
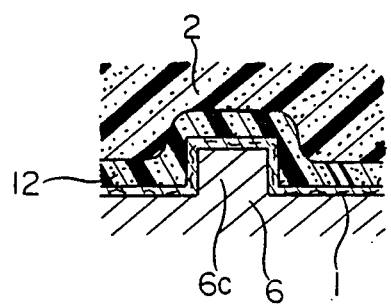
FIG. 9 is an enlarged sectional view of a groove portion of the seat with the corresponding portion of a mold.

FIG. 9 shows a groove formation, which is similar to the case of FIG. 8.

The method according to the present invention provides the following advantages:

(A) The prior art difficulty of accurately mounting the surface cover in the mold is eliminated by the manner of surface cover mounting shown in FIGS. 3, 4, 5, 6 and 7.

(B) The surface cover can be accurately and sharply shaped, by the presence of the portion 6a in FIG. 3 and 6b, 6c in FIGS. 8 and 9.

I claim:

1. A method of making an integrally foam-molded seat by disposing a surface cover along an inner wall surface of a molding cavity of a lower mold used for molding a polyurethane foam and having a seat surface pattern embossed on said inner wall surface, injecting a polyurethane resin solution into the molding cavity of said lower mold and foaming the polyurethane resin mold the polyurethane foam integrally combined with surface cover; said method comprising the steps of:

securing the marginal end edges of said surface cover to surface-cover end retaining members;

defining, adjacent to an upper peripheral edge of the molding cavity of said lower mold, a mold portion having a shape conforming to the shape of the combination of said end edges of said surface cover and said surface-cover end retaining member;

placing the surface cover along the inner wall surface of the molding cavity of said lower mold with said combination of the said end edges and said surface-cover end retaining member positioned in said mold portion;

injecting the polyurethane resin solution into the molding cavity of said lower mold; and foaming the polyurethane resin to mold the polyurethane foam integrally combined with said surface cover.

2. A method according to claim 1, wherein embossed portions of said surface cover are previously formed into desired shapes at the outside of said lower mold, and said surface cover is placed on corresponding convex and concave portions on said lower mold before foaming the polyurethane resin.

* * * * *